US006452782B1

(12) United States Patent
Otsuki et al.

(10) Patent No.: US 6,452,782 B1
(45) Date of Patent: Sep. 17, 2002

(54) NON-AQUEOUS ELECTROLYTE ELECTRIC DOUBLE-LAYER CAPACITOR, DETERIORATION INHIBITOR FOR NON-AQUEOUS ELECTROLYTE ELECTRIC DOUBLE-LAYER CAPACITOR AND ADDITIVE FOR NON-AQUEOUS ELECTROLYTE ELECTRIC DOUBLE-LAYER CAPACITOR

(75) Inventors: Masashi Otsuki, Musashimurayama; Shigeki Endo; Takao Ogino, both of Tokorozawa, all of (JP)

(73) Assignee: Bridgestone Corporation, Tokyo (JP)

( * ) Notice: Subject to any disclaimer, the term of this patent is extended or adjusted under 35 U.S.C. 154(b) by 98 days.

(21) Appl. No.: 09/708,717

(22) Filed: Nov. 9, 2000

(30) Foreign Application Priority Data

| Nov. 25, 1999 | (JP) | 11-334960 |
| Nov. 25, 1999 | (JP) | 11-334961 |
| Nov. 25, 1999 | (JP) | 11-334965 |
| Nov. 25, 1999 | (JP) | 11-334966 |
| Apr. 26, 2000 | (JP) | 2000-126572 |
| Apr. 26, 2000 | (JP) | 2000-126573 |
| Apr. 26, 2000 | (JP) | 2000-126574 |
| Apr. 26, 2000 | (JP) | 2000-126575 |

(51) Int. Cl.$^7$ ................................. H01G 9/02
(52) U.S. Cl. ............. 361/504; 361/508; 361/528; 361/503; 361/572; 429/328; 429/329; 29/25.03
(58) Field of Search ................. 361/504, 502, 361/433, 503, 512, 518, 528, 508, 509, 511, 523; 429/328, 329; 29/25.03

(56) References Cited

U.S. PATENT DOCUMENTS

| 4,713,731 A | * | 12/1987 | Boss et al. .................. 361/433 |
| 5,591,545 A | * | 1/1997 | Miyashita et al. ........... 429/218 |
| 5,725,968 A | * | 3/1998 | Sato et al. .................. 429/218 |
| 5,780,185 A | * | 7/1998 | Oki et al. .................... 429/218 |
| 6,152,970 A | * | 11/2000 | Wei et al. ................... 29/25.03 |

FOREIGN PATENT DOCUMENTS

| JP | 6-013108 | 1/1994 |
| JP | 06-013108 | 1/1994 |
| JP | 11-144757 | 5/1999 |
| JP | 11-191431 | 7/1999 |
| JP | 2000-021442 | 1/2000 |
| JP | 2000-030740 | 1/2000 |

* cited by examiner

Primary Examiner—Dean A. Reichard
Assistant Examiner—Nguyen T Ha
(74) Attorney, Agent, or Firm—Oliff & Berridge, PLC

(57) ABSTRACT

A non-aqueous electrolyte electric double-layer capacitor which has superior resistance to deterioration and superior properties at low temperatures while maintaining electrical characteristics such as sufficient electric conductivity and the like, and a non-aqueous electrolyte of the capacitor has low surface resistance.

A first aspect of the non-aqueous electrolyte electric double-layer capacitor has a positive electrode, a negative electrode and a non-aqueous electrolyte which contains at least 2% by volume to less than 20% by volume of phosphazene derivative and a supporting electrolyte. A second aspect thereof has the positive electrode, the negative electrode and the non-aqueous electrolyte which contains at least 20% by volume of phosphazene derivative and the supporting electrolyte.

20 Claims, No Drawings

NON-AQUEOUS ELECTROLYTE ELECTRIC DOUBLE-LAYER CAPACITOR, DETERIORATION INHIBITOR FOR NON-AQUEOUS ELECTROLYTE ELECTRIC DOUBLE-LAYER CAPACITOR AND ADDITIVE FOR NON-AQUEOUS ELECTROLYTE ELECTRIC DOUBLE-LAYER CAPACITOR

BACKGROUND OF THE INVENTION

1. Field of the Invention

The present invention relates to a non-aqueous electrolyte electric double-layer capacitor used in various types of energy reserves such as backup power supplies, auxiliary power supplies and the like, and which has superior self-extinguishability or incombustibility, an additive used for the non-aqueous electrolyte electric double-layer capacitor and an deterioration inhibitor used for the non-aqueous electrolyte electric double-layer capacitor which can effectively suppress the deterioration of the non-aqueous electrolyte electric double-layer capacitor.

2. Description of the Related Art

A non-aqueous electrolyte electric double-layer capacitor is a capacitor which utilizes an electric double-layer formed between a polarized electrode and an electrolyte. The non-aqueous electrolyte electric double-layer capacitor was developed and commercialized in the 1970s, underwent a period akin to early infancy in the 1980s, and experienced a period of growth and development period in the 1990s.

The non-aqueous electrolyte electric double-layer capacitor is different from a battery, whose charge-and-discharge cycle is a cycle of oxidation reduction reaction accompanying movements of substances, in that the charge-and-discharge cycle is a cycle in which ions are electrically adsorbed from an electrolyte on an electrode surface. The non-aqueous electrolyte electric double-layer capacitor has the following advantages, compared with a battery. That is, the non-aqueous electrolyte electric double-layer capacitor has a superior instantaneous charge-and-discharge property. Even if the charge-and-discharge cycle is repeated, the instantaneous charge-and-discharge property hardly deteriorates. Further, since a charge-and-discharge overvoltage is not generated at a time of the charge-and-discharge, it suffices as a simple and inexpensive electric circuit. Moreover, the remaining capacity of the non-aqueous electrolyte electric double-layer capacitor is easily known. The non-aqueous electrolyte electric double-layer capacitor has durable temperature properties under temperature conditions within a wide range of −30 to 90° C., and is non-polluting. Thus, the non-aqueous electrolyte electric double-layer capacitor has attracted interest recently as a new energy reserve product which is harmless to the global environment.

The non-aqueous electrolyte electric double-layer capacitor is an energy reserve device which has positive and negative polarized electrodes and an electrolyte. On a contact interface between the polarized electrodes and the electrolyte, positive charges and negative charges are arranged so as to face with each other with an extremely short distance therebetween so as to form an electric double-layer. Since the electrolyte serves as an ion source for forming the electric double-layer, similar to the polarized electrodes, the electrolyte is an important substance which controls the basic properties of the energy reserve device.

An aqueous electrolyte, a non-aqueous electrolyte, a solid electrolyte and the like have been conventionally known as the electrolyte. Among them, in view of improving the energy density of a non-aqueous electrolyte electric double-layer capacitor, the non-aqueous electrolyte has especially attracted interest because a high operational voltage can be set. The practical application thereof is proceeding.

For example, non-aqueous electrolytes, prepared by dissolving a solute (supporting electrolyte) such as $(C_2H_5)_4P.BF_4$, $(C_2H_5)_4N.BF_4$ and the like in an organic solvent having a high dielectric constant such as carbonates (ethylene carbonate, propylene carbonate and the like), γ-butyrolactone and the like, have been practically used.

However, in the case of these non-aqueous electrolytes, thre has been the problem that, since the flash points of solvents contained therein are low, if the non-aqueous electrolyte electric double-layer capacitor ignites by generated heat, the non-aqueous electrolyte also ignites. Flames spread on the surface of the non-aqueous electrolyte, and it is highly dangerous. There has also been the problem that vaporization and decomposition of the non-aqueous electrolyte due to heat or the like can generate gas which causes the non-aqueous electrolyte electric double-layer capacitor to burst or ignite, thereby the non-aqueous electrolyte also ignites and flames spread on the surface of the non-aqueous electrolyte. It is therefore highly dangerous.

Recently, accompanying the practical use of the non-aqueous electrolyte electric double-layer capacitor, expectations have come to be placed on the application thereof to electric cars, hybrid cars and the like. The demand for the safety of the non-aqueous electrolyte electric double-layer capacitor continues to escalate each day. Further, since the non-aqueous electrolyte electric double-layer capacitor has high performance but is generally easy to deteriorate, the development of technology in which the deterioration of the non-aqueous electrolyte electric double-layer capacitor can be avoided and characteristics thereof can be highly maintained for a long time is in strong demand.

In the midst of such circumstances, development has been anticipated of a non-aqueous electrolyte electric double-layer capacitor which has inherently high safety regardless of safety measures such as providing of an accessory component such as a safety valve or the like, which has self-extinguishability, in which it becomes difficult for flames to spread even if a non-aqueous electrolyte contained therein ignites, or flame-resistance in which it becomes difficult for the non-aqueous electrolyte to ignite, which has superior resistance to deterioration, superior properties at low temperatures, long term stability, and can be easily manufactured, and of an additive therefor.

SUMMARY OF THE INVENTION

The present invention has been devised in order to satisfy such demands, to resolve conventional problems and to accomplish the following objects.

A first object of the present invention is to provide a non-aqueous electrolyte electric double-layer capacitor which has superior resistance to deterioration in which the surface resistance of the non-aqueous electrolyte is low, and which has superior properties at low temperatures, while maintaining electrical characteristics such as sufficient electric conductivity and the like.

A second object of the present invention is to provide a non-aqueous electrolyte electric double-layer capacitor which has superior self-extinguishability or flame-resistance, in which the surface resistance of the non-aqueous electrolyte is low, and which has superior properties at low temperatures, while maintaining electrical characteristics such as sufficient electric conductivity and the like.

A third object of the present invention is to provide an deterioration inhibitor for a non-aqueous electrolyte electric double-layer capacitor which, by being added into the non-aqueous electrolyte in the non-aqueous electrolyte electric double-layer capacitor, can prevent deterioration of the non-aqueous electrolyte, can lower the surface resistance of the non-aqueous electrolyte, which can give superior properties at low temperatures, while maintaining electrical characteristics such as sufficient electric conductivity and the like.

A fourth object of the present invention is to provide an additive for a non-aqueous electrolyte electric double-layer capacitor which, by being added into the non-aqueous electrolyte in the non-aqueous electrolyte electric double-layer capacitor, can give self-extinguishability or incombustibility to the non-aqueous electrolyte, which can lower the surface resistance of the non-aqueous electrolyte, and which can give superior properties at low temperatures, while maintaining electrical characteristics such as sufficient electric conductivity and the like.

A first aspect of the non-aqueous electrolyte electric double-layer capacitor of the present invention in order to accomplish the first object has a positive electrode, a negative electrode and a non-aqueous electrolyte which contains at least 2% by volume to less than 20% by volume of phosphazene derivative and a supporting electrolyte.

A second aspect of the non-aqueous electrolyte electric double-layer capacitor of the present invention in order to accomplish the second object has a positive electrode, a negative electrode and a non-aqueous electrolyte which contains at least 20% by volume of phosphazene derivative and a supporting electrolyte.

The deterioration inhibitor for non-aqueous electrolyte electric double-layer capacitor of the present invention to accomplish the third object is added to the non-aqueous electrolyte in the non-aqueous electrolyte electric double-layer capacitor which has the non-aqueous electrolyte which contains a supporting electrolyte and an organic solvent, and contains at least a phosphazene derivative.

The additive for non-aqueous electrolyte electric double-layer capacitor of the present invention to accomplish the fourth object is added to the non-aqueous electrolyte in the non-aqueous electrolyte electric double-layer capacitor which has the non-aqueous electrolyte which contains the supporting electrolyte and the organic solvent, and contains at least the phosphazene derivative.

DESCRIPTION OF THE PREFERRED EMBODIMENTS

A non-aqueous electrolyte electric double-layer capacitor of the present invention has a positive electrode, a negative electrode, a non-aqueous electrolyte, and other members if necessary.

An deterioration inhibitor for the non-aqueous electrolyte electric double-layer capacitor and an additive for the non-aqueous electrolyte electric double-layer capacitor of the present invention are added to a non-aqueous electrolyte in a known non-aqueous electrolyte electric double-layer capacitor which has the positive electrode, the negative electrode and other members appropriately selected if necessary.

Positive Electrode

The positive electrode is not particularly limited and can be appropriately selected as long as it meets the objects of the present invention. In general, a carbon-based polarized electrode (for example, activated carbon) is preferable.

The polarized electrode is not particularly limited and can be appropriately selected as long as it meets the objects of the present invention. In general, examples of the polarized electrode include electrodes which contain an active carbon and other components such as a conductive agent, a binder and the like if necessary. Among them, an electrode having characteristics such as large specific surface area, large bulk specific gravity, electrochemical inactivity and low resistance is preferable.

Materials for the active carbon are not particularly limited, and examples thereof include phenol resins, various types of heat- resistant resins, pitch and the like.

Examples of the heat-resistant resins include, for example, polyimide resin, polyamide resin, polyamide-imide resin, polyetherimide resin, polyether sulphone resin, polyether ketone resin, bismaleinimide triazine resin, aramid resin, fluororesin, polyphenylene resin, polyphenylene sulfide resin and the like. These heat-resistant resins may be used alone or in combination of two or more kinds.

The form of the active carbon used for the positive electrode is preferably powder, fiber cloth or the like, in view of making the specific surface area higher and the charge capacity of the non-aqueous electrolyte electric double-layer capacitor larger.

The active carbon may be subjected to treatments such as heat processing, drawing, vacuum high temperature processing, rolling and the like in order to make the charge capacity of the non-aqueous electrolyte electric double-layer capacitor higher.

The conductive agent is not particularly limited, and examples thereof include graphite, acetylene black and the like.

Materials for the binder are not particularly limited, and examples thereof include resins such as polyvinylidene fluoride, tetrafluoroethylene and the like.

Negative Electrode

Examples of the negative electrode include a polarized electrode similar to the positive electrode.

Non-Aqueous Electrolyte

The non-aqueous electrolyte contains a phosphazene derivative, a supporting electrolyte and other components such as an organic solvent and the like, if necessary.

The non-aqueous electrolyte to which the deterioration inhibitor for the non-aqueous electrolyte electric double-layer capacitor and the additive for the non-aqueous electrolyte electric double-layer capacitor are added contains the organic solvent, the supporting electrolyte and other components if necessary.

Supporting Electrolyte

The supporting electrolyte can be selected from conventionally known supporting electrolytes. A quaternary ammonium salt is preferable in view of electrical characteristics such as superior electric conductivity in a non-aqueous electrolyte and the like.

The quaternary ammonium salt is a solute which serves as an ion source to form an electric double-layer in the non-aqueous electrolyte. It is necessary that the quaternary ammonium salt can form multivalent ions, in view of being able to effectively improve the electric conductivity of the non-aqueous electrolyte.

Examples of the quaternary ammonium salt include, for example, $(CH_3)_4N \cdot BF_4$, $(CH_3)_3C_2H_5N \cdot BF_4$, $(CH_3)_2$ $(C_2H_5)_2N\cdot BF_4$, $CH_3(C_2H_5)_3N\cdot BF_4$, $(C_2H_5)_4N\cdot BF_4$, $(C_3H_7)_4N\cdot BF_4$, $CH_3(C_4H_9)_3N\cdot BF_4$, $(C_4H_9)_4N\cdot BF_4$, $(C_6H_{13})_4N\cdot BF_4$, $(C_2H_5)_4N\cdot ClO_4$, $(C_2H_5)_4N\cdot BF_4$, $(C_2H_5)_4N\cdot PF_6$, $(C_2H_5)_4N\cdot AsF_6$, $(C_2H_5)_4N\cdot SbF_6$, $(C_2H_5)_4N\cdot CF_3SO_3$, $(C_2H_5)_4N\cdot C_4F_9SO_3$, $(C_2H_5)_4N\cdot(CF_3SO_2)_2N$, $(C_2H_5)_4N\cdot BCH_3(C_2H_5)_3$, $(C_2H_5)_4N\cdot B(C_2H_5)_4$, $(C_2H_5)_4N\cdot B(C_4H_9)_4$, $(C_2H_5)_4N\cdot B(C_6H_5)_4$ and the like, hexafluorophosphates thereof and the like. Further, in order to improve the solubility of the quaternary ammonium salt, quaternary ammonium salts having a high polarizability and in which different alkyl groups bond to N atoms are also appropriate. In the first aspect of the present invention, quaternary ammonium salts whose negative ion moieties (for example, $BF_4$, $ClO_4$, $AsF_6$ and the like) are substituted by $PF_6$ are appropriate, in that the anti-deterioration effect of the phosphazene derivative effectively works.

Further, in the present invention, examples of the quaternary ammonium salt include, for example, compounds represented by the following structural formulae (1) to (10). In the first aspect of the non-aqueous electrolyte electric double-layer capacitor and the deterioration inhibitor for non-aqueous electrolyte electric double-layer capacitor, quaternary ammonium salts, in which negative moieties in structural formulae (1) to (10) ($\cdot BF_4$s) are substituted by $\cdot PF_6$, are also appropriate, in that the anti-deterioration effect of the phosphazene derivative effectively works.

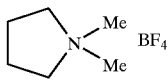
Structural Formula (1)

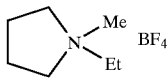
Structural Formula (2)

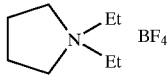
Structural Formula (3)

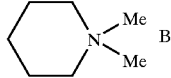
Structural Formula (4)

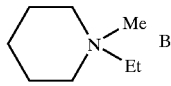
Structural Formula (5)

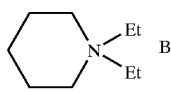
Structural Formula (6)

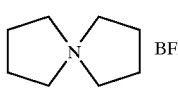
Structural Formula (7)

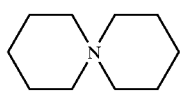
Structural Formula (8)

Sturctural Formula (9)

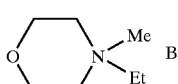

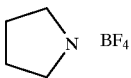
Structural Formula (10)

In the above structural formulae, Me represents a methyl group and Et represents an ethyl group.

Among these quaternary ammonium salts, from the standpoint of ensuring high electric conductivity, salts which can generate $(CH_3)_4N^+$, $(C_2H_5)_4N^+$ or the like as cations are especially preferable. Further, salts which can generate anions having small formula weight are preferable.

These quaternary ammonium salts may be used alone or in combination of two or more kinds.

A proportional amount of the supporting electrolyte is preferably 0.2 to 1.5 moles and more preferably 0.5 to 1.0 moles per kg of the non-aqueous electrolyte (solvent component).

When the proportional amount is less than 0.2 moles, sometimes electrical characteristics such as sufficient electric conductivity of the non-aqueous electrolyte and the like may not be ensured. When the proportional amount exceeds 1.5 moles, sometimes the viscosity of the non-aqueous electrolyte increases and sufficient mobility of the quaternary ammonium salt cannot be ensured. As a result, as mentioned above, the electrical characteristics such as sufficient electric conductivity and the like may not be ensured.

Phosphazene Derivative (Compound)

The deterioration inhibitor for the non-aqueous electrolyte electric double-layer capacitor or the additive for the non-aqueous electrolyte electric double-layer capacitor of the present invention contains at least a phosphazene derivative (compound). The phosphazene derivative (compound) is added to a non-aqueous electrolyte in a known non-aqueous electrolyte electric double-layer capacitor.

In the first aspect of the non-aqueous electrolyte electric double-layer capacitor, the reason that the non-aqueous electrolyte contains the phosphazene derivative and the reason that the deterioration inhibitor for the non-aqueous electrolyte electric double-layer capacitor is added to the non-aqueous electrolyte are as follows.

That is, in the non-aqueous electrolyte electric double-layer capacitor, compounds generated by decomposition or reaction of the non-aqueous electrolyte or the supporting electrolyte contained in the non-aqueous electrolyte corrode electrodes and their peripheral members. Alternatively, an amount of the supporting electrolyte itself decreases by the decomposition or the reaction. As a result, electrical characteristics and performance may deteriorate. On the other hand, the phosphazene derivative suppresses the decomposition or the reaction of the non-aqueous electrolyte or the supporting electrolyte contained in the non-aqueous electrolyte so as to contribute to stabilization (especially, the phosphazene derivative effectively acts on a $PF_6$ salt). By incorporating the phosphazene derivative in the non-aqueous electrolyte or by adding the phosphazene derivative to the non-aqueous electrolyte, it becomes possible to prevent the deterioration of the non-aqueous electrolyte electric double-layer capacitor while maintaining the electrical characteristics thereof.

In the second aspect of the non-aqueous electrolyte electric double-layer capacitor, the reason that the non-aqueous electrolyte contains the phosphazene derivative and the reason that the additive for the non-aqueous electrolyte electric double-layer capacitor is added to the non-aqueous electrolyte are as follows.

Conventionally, in a non-aqueous solvent having as a base an aprotic organic solvent used in a non-aqueous electrolyte in a non-aqueous electrolyte electric double-layer capacitor, sometimes when a large electric current is abruptly released when a short-circuit occurs and the capacitor becomes abnormally exothermic, the electrolyte vaporizes or decomposes, gas is generated, and the capacitor bursts/catches fire due to the generated gas or heat. The risk of danger is therefore high. However, when a phosphazene derivative is included in these conventional non-aqueous electrolytes, it becomes possible to reduce such risks since excellent self-extinguishability or incombustibility is made manifest in the non-aqueous electrolyte by the action of nitrogen gas, halogen gas or the like derived from the phosphazene derivative, or by phosphorous atoms (P atoms) suppressing the chain decomposition of polymer materials in the non-aqueous electrolyte electric double-layer capacitor.

Incorporated Amount

In the first aspect of the non-aqueous electrolyte electric double-layer capacitor, the amount of the phosphazene derivative in the non-aqueous electrolyte must be greater than or equal to 2% by volume to less than 20% by volume. The amount thereof is preferably greater than or equal to 3% by volume to less than 20% by volume.

When the amount is greater than or equal to 2% by volume to less than 20% by volume, deterioration of the non-aqueous electrolyte electric double-layer capacitor can be appropriately suppressed.

Deterioration refers to corrosion of electrodes and their peripheral members and a corresponding decrease in the concentration of the supporting electrolyte due to the generation of a compound caused by the decomposition or reaction of the non-aqueous electrolyte or the supporting electrolyte. The effect of preventing the deterioration can be evaluated by the following "Stability Evaluation Method". That is, (1) firstly, a non-aqueous electrolyte containing a supporting electrolyte is prepared and its moisture percentage is measured. Next, the concentration of hydrogen fluoride in the non-aqueous electrolyte is measured by NMR or GC-MS. Further, a color tone of the non-aqueous electrolyte is visually observed and the electric conductivity thereof is measured. (2) The non-aqueous electrolyte is left for two months in a glovebox, and then the moisture percentage thereof and the concentration of hydrogen fluoride are again measured, the color tone of the resultant non-aqueous electrolyte is observed, and the electric conductivity thereof is measured. The stability is evaluated in accordance with the changes in the obtained values.

In the second aspect of the non-aqueous electrolyte electric double-layer capacitor, the amount of the phosphazene derivative in the non-aqueous electrolyte must be at least 20% by volume and preferably at least 30% by volume. An upper limit of the amount of the phosphazene derivative is not especially limited. The amount of the phosphazene derivative in the non-aqueous electrolyte may be 100% by volume.

When the amount is less than 20% by volume, the self-extinguishability may not be sufficient. On the other hand, when the amount is at least 30% by volume, the non-aqueous electrolyte can exhibit sufficient incombustibility.

In the present invention, "self-extinguishable" refers, in the "Evaluation of Self-Extinguishability or Incombustibility" described below, to a property in an ignited flame is extinguished at a 25 mm to 100 mm line and which achieves a state in which even deposits cannot catch flame. "Incombustible" refers, in the "Evaluation of Self-Extinguishability or Incombustibility" described below, to a property in which an ignited flame does not reach a 25 mm line and which achieves a state in which even deposits cannot catch flame.

Evaluation of self-extinguishability and incombustibility is conducted by measuring and evaluating the burning action of an ignited flame in an atmospheric environment using a method in which a UL94HB testing method of UL (Underwriting Laboratory) specifications has been arranged. Ignitability, combustibility, generation of carbides and the phenomenon of second ignition are observed, and in conformity with UL94HB testing method standards a specimen of 127 mm×12.7 mm is used as the sample. A noncombustible quartz fiber is used for the preparation of the specimen, and various types of electrolytes of 1 ml are instilled therein.

An added amount of the deterioration inhibitor for the non-aqueous electrolyte electric double-layer capacitor to the non-aqueous electrolyte in the non-aqueous electrolyte electric double-layer capacitor is preferably 2 to 90% by volume and more preferably 3 to 75% by volume. Further, a range of at least 2% by volume to less than 20% by volume is preferable and a range of at least 3% by volume to less than 20% by volume is more preferable.

When the added amount is less than 2% by volume, deterioration of the non-aqueous electrolyte electric double-layer capacitor may not be sufficiently suppressed. When the added amount exceeds 90% by volume, the viscosity of the non-aqueous electrolyte becomes higher and superior electrical characteristics such as electric conductivity and the like may not be maintained.

Examples of the added amount of the additive for the non-aqueous electrolyte electric double-layer capacitor to the non-aqueous electrolyte in the non-aqueous electrolyte electric double-layer capacitor appropriately include a first added amount which provides the non-aqueous electrolyte with self-extinguishability and a second added amount which provides the non-aqueous electrolyte with incombustibility.

The first added amount is preferably 20 to 90% by volume and more preferably 40 to 75% by volume. A range of at least 20% by volume to less than 30% by volume is also preferable.

When the first added amount is less than 20% by volume, the self-extinguishability may not be sufficiently given to the non-aqueous electrolyte. When the first added amount exceeds 90% by volume, the viscosity of the non-aqueous electrolyte becomes higher and electrical characteristics such as electric conductivity and the like may decrease.

The second added amount is preferably 30 to 90% by volume and more preferably 40 to 60% by volume.

When the second added amount is less than 30% by volume, incombustibility may not be sufficiently given to the non-aqueous electrolyte. When the second added amount exceeds 90% by volume, the viscosity of the non-aqueous electrolyte becomes higher and electrical characteristics such as electric conductivity and the like may decrease.

Molecular Structure

The phosphazene derivative preferably has a substituent including halogen in the molecular structure thereof.

When the phosphazene derivative has a substituent including halogen in the molecular structure thereof, even for an amount less than that within the numerical value range of the phosphazene derivative, it becomes possible for the non-aqueous electrolyte to effectively exhibit self-extinguishability or incombustibility by halogen gases derived from the phosphazene derivative. Specifically, when the phosphazene derivative has a substituent including halogen in the molecular structure thereof, the first added amount is preferably 10 to 90% by volume and more preferably 20 to 75% by volume. The second added amount is preferably 20 to 90% by weight and more preferably 30 to 60% by weight.

Further, in a compound in which halogen is included in the substituent, a problem may exist in generation of halogen radicals. However, in the phosphazene derivative of the present invention, because the phosphorus element in the molecular structure arrests halogen radicals to form a stable phosphorus halide, such a problem does not arise.

The amount of halogen in the phosphazene derivative is preferably 2 to 8% by weight, more preferably 2 to 60% by weight and most preferably 2 to 50% by weight.

When the amount is less than 2% by weight, it may not possible to obtain significant halogen addition effect. When the amount exceeds 80% by weight, the viscosity of the non-aqueous electrolyte becomes higher and electrical characteristics such as electric conductivity and the like may decrease.

Examples of halogen appropriately include fluorine, chlorine, bromine and the like. Among them, fluorine is especially preferable.

The phosphazene derivative is not especially limited as long as it is a liquid at room temperature (25° C.). Examples of the phosphazene derivative include, for example, a chain phosphazene derivative represented by the following general formula (1) and a cyclic phosphazene derivative represented by the following general formula (2).

General Formula (1)

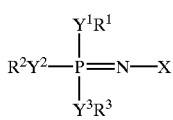

wherein $R^1$, $R^2$ and $R^3$ represent monovalent substituents or halogen. X represents a group which includes at least one element selected from a group of carbon, silicon, germanium, tin, nitrogen, phosphorus, arsenic, antimony, bismuth, oxygen, sulfur, selenium, tellurium and polonium. $y^1$, $y^2$ and $Y^3$ represent bivalent connecting groups, bivalent elements or single bond.

General Formula (2)

$(PNR^4_2)_n$ wherein $R^4$ represents a monovalent substituent or halogen. n represents a number of 3 to 15.

In general formula (1), $R^1$, $R^2$ and $R^3$ are not especially limited as long as they are monovalent substituents or halogen, and can be appropriately selected.

Examples of the monovalent substituent include alkoxy group, alkyl group, carboxy group, acyl group, aryl group and the like. Examples of halogen appropriately include, for example, the above-mentioned halogen. Among them, the alkoxy group is preferable from the standpoint of making the viscosity of non-aqueous electrolyte low. $R^1$ to $R^3$ may be the same substituents with each other or some of them may be different substituents.

Examples of the alkoxy group include, for example, methoxy group, ethoxy group, propoxy group, butoxy group, alkoxy substituted alkoxy group such as methoxyethoxy group, methoxyethoxyethoxy group and the like. Among them, all of $R^1$ to $R^3$ are preferably methoxy group, ethoxy group, methoxyethoxy group or methoxyethoxyethoxy group and more preferably methoxy group or ethoxy group in view of low viscosity and high dielectric constant.

Examples of the alkyl group include, for example, methyl group, ethyl group, propyl group, butyl group, pentyl group and the like.

Examples of the acyl group include, for example, formyl group, acetyl group, propionyl group, butyryl group, isobutyryl group, valeryl group and the like.

Examples of the aryl group include, for example, phenyl group, tolyl group, naphthyl group and the like.

As described above, hydrogen elements in these substituents are preferably substituted by halogen.

In general formula (1), examples of groups represented by $y^1$, $y^2$ and $Y^3$ include, in addition to $CH_2$ group, groups including oxygen, sulfur, selenium, nitrogen, boron, aluminum, scandium, gallium, yttrium, indium, lanthanum, thallium, carbon, silicon, titanium, tin, germanium, zirconium, zinc, phosphorus, vanadium, arsenic, niobium, antimony, tantalum, bismuth, chromium, molybdenum, tellurium, polonium, tungsten, iron, cobalt, nickel and the like. Among them, the $CH_2$ group and groups including oxygen, sulfur, selenium, nitrogen are preferable. In view of remarkably improving the incombustibility of the non-aqueous electrolyte, it is especially preferable that $y^1$, $y^2$ and $Y^3$ are groups including sulfur and selenium. $y^1$ to $Y^3$ may be the same or different from each other.

In general formula (1), X is preferably an organic group including at least one kind of element selected from a group of carbon, silicon, nitrogen, phosphorus, oxygen and sulfur, in view of potential harm and environmental considerations. Preferably, X is a group having one of structures represented by the following groups (A) to (C).

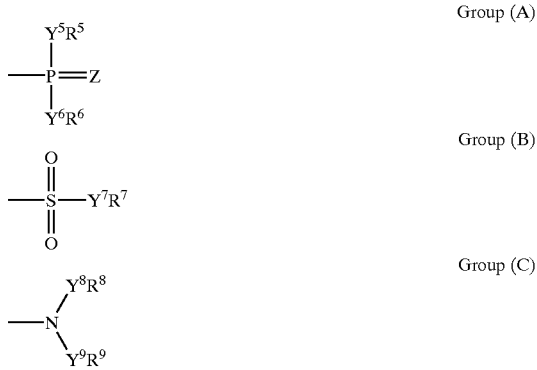

wherein $R^5$ to $R^9$ represent monovalent substituents or halogen. $Y^5$ to $y^9$ represent bivalent connecting groups, bivalent elements or single bond. Z represents a bivalent group or a bivalent element.

In groups (A) to (C), examples of $R^5$ to $R^9$ include the same monovalent substituents or halogen as in $R^1$ to $R^3$ in general formula (1). The monovalent substituents or halogen may be the same or different from each other within the same organic group. $R^5$ and $R^6$, and $R^8$ and $R^9$ may bond with each other to form a ring.

Examples of groups represented by $Y^5$ to $Y^9$ in groups (A) to (C) include the same bivalent connecting group or the same bivalent groups as in $y^1$ to $Y^3$ in general formula (1). In view of remarkably improving the incombustibility of the non-aqueous electrolyte, groups including sulfur and selenium are especially preferable. These groups may be the same or different from each other within the same organic group.

In groups (A) to (C), examples of Z include, in addition to $CH_2$ group, CHR (hereinafter, R represents alkyl group, alkoxyl group, phenyl group or the like) group and NR group, groups including elements such as oxygen, sulfur, selenium, boron, aluminum, scandium, gallium, yttrium, indium, lanthanum, thallium, carbon, silicon, titanium, tin, germanium, zirconium, zinc, phosphorus, vanadium, arsenic, niobium, antimony, tantalum, bismuth, chromium, molybdenum, tellurium, polonium, tungsten, iron, cobalt, nickel and the like.

Among them, in addition to the $CH_2$ group, the CHR group and the NR group, groups including elements such as oxygen, sulfur and selenium are preferable. In view of remarkably improving the incombustibility of the non-aqueous electrolyte, groups including sulfur and selenium are especially preferable.

In groups (A) to (C), a group including phosphorus such as Group (A) is especially preferable in view of effectively providing resistance to deterioration, self-extinguishability or incombustibility. A group including sulfur such as Group (B) is especially preferable in view of ensuring low surface resistance of the non-aqueous electrolyte.

In general formula (2), $R^4$ is not particularly limited provided that it is a monovalent substituent or halogen, and can be appropriately selected. Examples of the monovalent substitutent include alkoxy groups, alkyl groups, carboxyl groups, acyl groups, aryl groups and the like. Examples of the halogen appropriately include the above-mentioned halogen. Among them, in view of making the viscosity of the non-aqueous electrolyte low, alkoxy groups are especially preferable.

Examples of the alkoxy group include methoxy groups, ethoxy groups, methoxyethoxy groups, propoxy groups, phenoxy groups and the like. Among them, methoxy groups, ethoxy groups and methoxyethoxy groups are especially preferable.

As described above, hydrogen elements in these substituents are preferably substituted by halogen.

$R^1$ to $R^9$, $Y^1$ to $Y^3$, $Y^5$ to $Y^9$ and Z in general formulae (1) and (2) and groups (A) to (B) are selected appropriately. Therefore, the non-aqueous electrolyte which has a more appropriate viscosity, solubility and the like, the deterioration inhibitor for the non-aqueous electrolyte electric double-layer capacitor or the additive for the non-aqueous electrolyte electric double-layer capacitor can be prepared.

A flash point of the phosphazene derivative is not particularly limited. In view of suppressing ignition, the flash point of the phosphazene derivative is preferably at least 100° C. and more preferably at least 150° C.

The above-described phosphazene derivative may be used alone or in combination of two or more kinds.

By adding the deterioration inhibitor for the non-aqueous electrolyte electric double-layer capacitor having the phosphazene derivative to the non-aqueous electrolyte in the non-aqueous electrolyte electric double-layer capacitor, it becomes possible to easily manufacture a non-aqueous electrolyte electric double-layer capacitor in which deterioration of the non-aqueous electrolyte is prevented, the surface resistance of the non-aqueous electrolyte is lowered, the non-aqueous electrolyte is provided with superior properties at low temperatures, high stability is maintained over a long period of time, and which has properties equally as superior as those of ordinary capacitors.

By adding the additive for the non-aqueous electrolyte electric double-layer capacitor to the non-aqueous electrolyte in the non-aqueous electrolyte electric double-layer capacitor, it becomes possible to easily manufacture a non-aqueous electrolyte electric double-layer capacitor in which the non-aqueous electrolyte manifests self-extinguishability or incombustilibity, the surface resistance of the non-aqueous electrolyte is lowered, the non-aqueous electrolyte is provided with superior properties at low temperatures, safety is high, and which has properties equally as superior as those of ordinary capacitors.

Organic Solvent

An organic solvent is especially preferable as the aprotic organic solvent in view of safety.

When the non-aqueous electrolyte contains an aprotic organic solvent, high safety can be obtained without reacting with materials of the negative electrode. Moreover, the viscosity of the non-aqueous electrolyte can be made low, and optimum ion conductivity and electric conductivity of the non-aqueous electrolyte electric double-layer capacitor can be easily accomplished.

The aprotic organic solvent is not particularly limited, and examples thereof include, for example, ether compounds, ester compounds and the like. Specifically, examples which can be suitably used include 1,2-dimethoxyethane, tetrahydrofurane, dimethyl carbonate, diethyl carbonate, ethylmethylcarbonate, ethylene carbonate, propylene carbonate, diphenyl carbonate, γ-butyrolactone, γ-valerolactone, sulforan, N,N-dimethylformamide (DMF), acetonitrile (AN) and the like.

Among them, a cyclic ester compound such as ethylene carbonate, proplylene carbonate, γ-butyrolactone and the like, a chain ester compound such as 1,2-dimethoxyethane, dimethylcarbonate, diethyl carbonate, ethylmethylcarbonate and the like are preferable.

The cyclic ester compound is particularly preferable in view of having a high relative dielectric constant and superior solubility in the supporting electrolyte. The chain ester compound is particularly preferable in view of having a low viscosity and being particularly effective in lowering viscosity.

These compounds may be used alone or in combination of two or more.

The viscosity of the aprotic organic solvent at 25° C. is preferably less than or equal to 10 mPa•s (10cP) in view of lowering the viscosity of the non-aqueous electrolyte.

Other Members

Other members include a separator, a collector and a container.

The separator is disposed between a positive electrode and a negative electrode in order to prevent a short circuit or the like of the non-aqueous electrolyte electric double-layer capacitor. The separator is not particularly limited, and known separators usually used for a non-aqueous electrolyte electric doubly layer capacitor are appropriately used.

Examples of the separator include, for example, a microporous film, a nonwoven fabric, paper and the like. Specifically, a nonwoven fabric, a thin layer film and the like made of a synthetic resin such as polytetrafluoroethylene, polypropylene, polyethylene and the like may be suitably used.

Among them, a microporous film having a thickness of about 20 to 50 μm and made of polypropylene or polyethylene is particularly preferable.

The collector is not particularly limited and can be appropriately selected from known collectors usually used for a non-aqueous electrolyte electric double-layer capacitor. Collectors which have superior electrochemical corrosion resistance, chemical corrosion resistance, workability, mechanical strength, and are inexpensive are preferable. Examples of the collector include a collector layer made of aluminum, stainless steel, a conductive resin or the like.

The container is not particularly limited and known containers usually used for a non-aqueous electrolyte electric double-layer capacitor are appropriately used.

Examples of materials for the container include aluminum, stainless steel, a conductive resin and the like.

In addition to the separator, the collector and the container, other members usually used for a non-aqueous electrolyte electric double-layer are appropriately used.

A shape of the above-described non-aqueous electrolyte electric double-layer capacitor is not particularly limited and examples thereof include known shapes such as a cylindrical shape (cylindrical shape, angled shape), a flat shape (coin shape) and the like.

The non-aqueous electrolyte electric double-layer capacitor is used as a memory backup for various types of electronic apparatuses, industrial apparatuses, aircraft apparatuses and the like, as an electromagnetic hold for toys, cordless apparatuses, gas apparatuses, instantaneous water heaters and the like, and as an electric power supply for wristwatches, wall clocks, solar watches, AGS wristwatches and the like.

The non-aqueous electrolyte electric double-layer capacitor of the first aspect of the present invention has superior resistance to deterioration and superior properties at low temperatures while maintaining electrical characteristics such as sufficient electric conductivity and the like, and the non-aqueous electrolyte of the capacitor has low surface resistance.

The non-aqueous electrolyte electric double-layer capacitor of the second aspect of the present invention has superior self-extinguishability or incombustibility and superior properties at low temperatures while maintaining electrical characteristics such as sufficient electric conductivity and the like, and the non-aqueous electrolyte of the capacitor has low surface resistance.

EXAMPLES

Examples 1 and 2 and Comparative Examples 1 and 2 of the non-aqueous electrolyte electric double-layer capacitor relating to the first aspect of the present invention are described hereinafter. The present invention are not limited to the Examples and the Comparative Examples.

Example 1

Preparation of Non-aqueous Electrolyte

To 49 ml of γ-butyrolactone (aprotic organic solvent), 1 ml (2% by volume) of a phosphazene derivative (chain EO type phosphazene derivative (a compound in which in general formula (1), X has a structure of group (A), all of $y^1$ to $Y^3$ and $Y^5$ to $y^6$ are single bond, all of $R^1$ to $R^3$ and $R^5$ to $R^6$ are ethoxy groups, and Z is oxygen)) was added. Then, tetraethyl ammonium hexafluorophosphate $(C_2H_5)_4N \cdot PF_6$ (supporting electrolyte) was dissolved in the resultant mixture at a concentration of 1 mol/kg to prepare a non-aqueous electrolyte.

Evaluation of Deterioration

The electric conductivities of the resultant non-aqueous electrolyte immediately after preparation thereof and after being left for two months in a glovebox were measured and calculated in the same manner as the above-described "Stability Evaluation Method". Color tone changes of the non-aqueous electrolyte immediately after preparation thereof and after being left for two months in the glovebox were visually observed. The results are shown in Table 1.

Color tone changes of the non-aqueous electrolyte immediately after preparation thereof and after being left for two months in the glovebox were visually observed, and no changes were detected.

Measurement of Electric Conductivity

A non-aqueous electrolyte electric double-layer capacitor was manufactured using the resultant non-aqueous electrolyte in a manner to be described later. 5 mA of constant current was applied to the obtained non-aqueous electrolyte double-layer capacitor and the electric conductivity thereof was measured using an electric conductivity meter (CDM210 manufactured by Radiometer Trading Co., Ltd.).

If the electric conductivity of the non-aqueous electrolyte at 25° C. is at least of 5.0 mS/cm, problems are not presented in actual use.

Manufacturing of Non-aqueous Electrolyte Electric Double-layer Capacitor

Manufacturing of Positive and Negative Electrodes (Polarized Electrode)

Active carbon (Kuractive-1500 manufactured by Kuraray Co., Ltd.), acetylene black (conductive agent) and tetrafluoroethylene (PTFE) (binder) were mixed together such that a weight ratio thereof (active carbon/acetylene black/PTFE) was 8/1/1 to obtain a mixture.

100 mg of the resultant mixture was extracted, and the extracted mixture was placed into a 20 mm φ pressure-resistant carbon container and formed at a pressure of 150 kgf/cm² and at room temperature to manufacture the positive and negative electrodes (polarized electrode).

Manufacturing of Non-aqueous Electrolyte Electric Double-layer Capacitor

A cell was assembled using the resultant positive and negative electrodes, an aluminum plate (collector) (thickness: 0.5 mm) and a polypropylene/polyethylene plate (separator) (thickness: 25 μm), and the assembled cell was thoroughly dried by vacuum drying.

The cell was impregnated with the non-aqueous electrolyte to manufacture a non-aqueous electrolyte electric double-layer capacitor.

Example 2

A non-aqueous electrolyte was prepared in the same manner as that of Example 1 except that, in the "Preparation of Non-aqueous Electrolyte" in Example 1, an added amount of the phosphazene derivative (chain EO type phosphazene derivative (a compound in which in general formula (1), X has a structure of group (A), all of $y^1$ to $Y^3$ and $Y^5$ to $y^6$ are single bond, all of $R^1$ to $R^3$ and $R^5$ to $R^6$ are ethoxy groups, and Z is oxygen)) was changed to 50% by volume, and the deterioration thereof was evaluated. Results are shown in Table 1.

Color tone changes of the non-aqueous electrolyte immediately after preparation thereof and after being left for two months in the glovebox were visually observed, and no changes were detected.

Comparative Example 1

A non-aqueous electrolyte was prepared in the same manner as in Example 1 except that, in the "Preparation of Non-aqueous Electrolyte" in Example 1, the phosphazene derivative (chain EO type phosphazene derivative (a compound in which in general formula (1), X has a structure of group (A), all Of $y^1$ to $y^3$ and $y^5$ to $y^6$ are single bond, all of $R^1$ to $R^3$ and $R^5$ to $R^6$ are ethoxy groups, and Z is oxygen)) was not used. The deterioration of the resultant non-aqueous electrolyte was evaluated. Results are shown in Table 1.

Color tone changes of the non-aqueous electrolyte immediately after preparation thereof and after being left for two months in the glovebox were visually observed. After the non-aqueous electrolyte was left for two months in the glovebox, the color of the non-aqueous electrolyte had turned black (or brown).

Comparative Example 2

A non-aqueous electrolyte was prepared in the same manner as in Example 1 except that in the "Preparation of Non-aqueous Electrolyte" in Example 1, instead of γ-butyrolactone (aprotic organic solvent), ethylene carbonate/diethyl carbonate (volume ratio: 1/1) (aprotic organic solvent) was used, and the phosphazene derivative (chain EO type phosphazene derivative (a compound in which in general formula (1), X has a structure of group (A), all of $y^1$ to $Y^3$ and $Y^5$ to $y^6$ are single bond, all of $R^1$ to $R^3$ and $R^5$ to $R^6$ are ethoxy groups, and Z is oxygen)) was not used. The deterioration of the resultant non-aqueous electrolyte was evaluated. Results are shown in Table 1.

Color tone changes of the non-aqueous electrolyte immediately after preparation thereof and after being left for two months in the glovebox were visually observed. After the non-aqueous electrolyte was left for two months in the globe box, the color of the non-aqueous electrolyte had turned black (or brown).

TABLE 1

| | Increase in HF Concentration (ppm) | Electric Conductivity (mS/cm) | Color Changes | Evaluation of Deterioration |
|---|---|---|---|---|
| Example 1 | 0 | 7.6 | none | high stability, superior resistance to deterioration |
| Example 2 | 0 | 6.8 | none | extremely high stability, extremely superior resistance to deterioration |
| Comparative Example 1 | 50 | 8.3 | changed to brown | low stability, occurrence of deterioration |
| Comparative Example 2 | 60 | 8.0 | changed to brown | low stability, occurrence of deterioration |

Examples 3 to 5 and Comparative Example 3 of the non-aqueous electrolyte electric double-layer capacitor relating to the second aspect of the present invention are described hereinafter. The present invention is not limited to the Examples and the Comparative Example.

Example 3

Preparation of Non-aqueous Electrolyte

To 40 ml of γ-butyrolactone (aprotic organic solvent), 10 ml (20% by volume) of phosphazene derivative (chain EO type phosphazene derivative (a compound in which in general formula (1), X has a structure of group (A), all of $y^1$ to $y^3$ and $y^5$ to $y^6$ are single bond, all of $R^1$ to $R^3$ and $R^5$ to $R^6$ are ethoxy groups, and Z is oxygen)) was added. Then, tetraethyl ammonium fluoroborate $(C_2H_5)_4N \cdot BF_4$ (supporting electrolyte) was dissolved in the resultant mixture at a concentration of 1 mol/kg to prepare a non-aqueous electrolyte.

Evaluation of Self-Extinguishability or Incombustibility

The resultant non-aqueous electrolyte was evaluated as shown below in the same manner as the above-described "Self-extinguishability and Incombustibility Evaluating Methods". Results are shown in Table 2.

Evaluation of Incombustibility
An evaluation of "incombustible" was recorded when an ignited flame did not reach a 25 mm line and material deposited from a net did not catch flame.
Evaluation of Self-Extinguishability
An evaluation of "self-extinguishable" was recorded when an ignited flame was extinguished at a line between 25 mm to 100 mm and material deposited from a net did not catch flame.
Evaluation of Combustibility
An evaluation of "combustible" was recorded when an ignited flame crossed a 100 mm line.
Manufacturing of Positive and Negative Electrodes (Polarized Electrode Active carbon (Kuractive-1500 manufactured by Kuraray Co., Ltd.), acetylene black (conductive agent) and tetrafluoroethylene (PTFE) (binder) were mixed together such that a weight ratio thereof (active carbon/acetylene black/PTFE) was 8/1/1 to obtain a mixture.

100 mg of the resultant mixture was extracted, and the extracted mixture was placed into a 20 mm φ pressure-resistant carbon container and formed at a pressure of 150 kgf/cm² and at room temperature to manufacture the positive and negative electrodes (polarized electrode).
Manufacturing of Non-aqueous Electrolyte Electric Double-Layer Capacitor A cell was assembled using the resultant positive and negative electrodes, an aluminum plate (collector) (thickness: 0.5 mm) and a polypropylene/polyethylene plate (separator) (thickness: 25 μm), and the assembled cell was thoroughly dried by vacuum drying.

The cell was impregnated with the non-aqueous electrolyte to manufacture a non-aqueous electrolyte electric double-layer capacitor.

Measurement of Electric Conductivity of Non-aqueous Electrolyte Electric Double-Layer Capacitor The electric conductivity of the resultant non-aqueous electrolyte electric double-layer capacitor was measured using an electric conductivity meter (CDM210, manufactured by Radiometer Trading Co., Ltd.), while 5 mA of constant current was applied thereto. Results are shown in FIG. 2.

If the electric conductivity of the non-aqueous electrolyte electric double-layer capacitor at 25° C. is at least 5.0 mS/cm, problems are not presented in actual use.

Example 4

A non-aqueous electrolyte was prepared in the same manner as that of Example 3 except that, in the "Preparation of Non-aqueous Electrolyte" in Example 3, an added amount of the phosphazene derivative (chain EO type phosphazene derivative (a compound in which in general formula (1), X has a structure of group (A), all of $y^1$ to $Y^3$ and $Y^5$ to $y^6$ are single bond, all of $R^1$ to $R^3$ and $R^5$ to $R^6$ are ethoxy groups, and Z is oxygen)) was changed to 80% by volume, and the incombustibility or the self-extinguishability of the resultant non-aqueous electrolyte was evaluated. Further, a non-aqueous electrolyte electric double-layer capacitor was manufactured in the same manner as in Example 3 and its electric conductivity was measured and evaluated. Results are shown in Table 2.

Example 5

A non-aqueous electrolyte was prepared in the same manner as that of Example 3 except that, in the "Preparation of Non-aqueous Electrolyte" in Example 1, a compound in which hydrogen elements in ethoxy groups in the phosphazene derivative (chain EO type phosphazene derivative (a compound in which in general formula (1), X has a structure of group (A), all of $y^1$ to $y^3$ and $Y^5$ to $y^6$ are single bond, all of $R^1$ to $R^3$ and $R^5$ to $R^6$ are ethoxy groups, and Z is oxygen)) were substituted by fluorine (the content of the fluorine in the phosphazene derivative was 12.4%), was used and the added amount of the compound was changed to 60% by volume. The incombustibility or the self-extinguishability of the resultant non-aqueous electrolyte was evaluated. Further, a non-aqueous electrolyte electric double-layer capacitor was manufactured in the same manner as in Example 3 and the electric conductivity thereof was measured and evaluated. Results are shown in Table 2.

Comparative Example 3

A non-aqueous electrolyte was prepared in the same manner as that of Example 3 except that in the "Preparation of Non-aqueous Electrolyte" in Example 3, the phosphazene derivative (chain EO type phosphazene derivative (a compound in which in general formula (1), X has a structure of group (A), all of $y^1$ to $y^3$ and $Y^5$ to $y^6$ are single bond, all of $R^1$ to $R^3$ and $R^5$ to $R^6$ are ethoxy groups, and Z is oxygen)) was not used. The incombustibility or the self-extinguishability of the resultant non-aqueous electrolyte was evaluated. Further, a non-aqueous electrolyte electric double-layer capacitor was manufactured in the same manner as in Example 3 and the electric conductivity thereof was measured and evaluated. Results are shown in Table 2.

TABLE 2

| | Electric Conductivity (mS/cm) | Evaluation of Self-Extinguishability or Incombustibility |
|---|---|---|
| Example 3 | 9.0 | Self-Extinguishable |
| Example 4 | 7.9 | Incombustible |
| Example 5 | 8.2 | Incombustible |
| Comparative Example 3 | 9.0 | Incombustible |

It is apparent that in Examples 3 to 5, the non-aqueous electrolyte has superior incombustibility or self-extinguishability and safety. Especially in Example 3, it is apparent that even with a little added amount of the phosphazene derivative, superior incombustibility can be applied to the non-aqueous electrolyte.

Examples 6 and 7 and Comparative Examples 4 and 5 of the deterioration inhibitor for non-aqueous electrolyte electric double-layer capacitor relating to the third aspect of the present invention are shown hereinafter. The present invention is not limited to the Examples and the Comparative Examples.

Example 6

Preparation of Non-aqueous Electrolyte

To 49 ml of γ-butyrolactone (aprotic organic solvent), 1 ml (2% by volume) of phosphazene derivative (chain EO type phosphazene derivative (a compound in which in general formula (1), X has a structure of group (A), all of $y^1$ to $Y^3$ and $y^5$ to $y^6$ are single bond, all of $R^1$ to $R^3$ and $R^5$ to $R^6$ are ethoxy groups, and Z is oxygen) (an deterioration inhibitor for non-aqueous electrolyte electric double-layer capacitor) was added. Then, tetraethyl ammonium hexafluorophosphate $(C_2H_5)_4N \cdot PF_6$ (quaternary ammonium salt) was dissolved in the resultant mixture at concentration of 1 mol/kg to prepare a non-aqueous electrolyte.

Evaluation of Deterioration

The electric conductivities of the resultant non-aqueous electrolyte immediately after preparation thereof and after being left for two months in a glovebox were measured and calculated in the same manner as the above-described "Stability Evaluating Method". Then, the deterioration of the non-aqueous electrolyte was evaluated. Color tone changes of the non-aqueous electrolyte immediately after preparation thereof and after being left for two months in the glovebox were visually observed. These results are shown in Table 3.

Color tone changes of the non-aqueous electrolyte immediately after preparation thereof and after being left for two months in the glovebox were visually observed, and no changes were detected.

Measurement of Electric Conductivity

A non-aqueous electrolyte electric double-layer capacitor was manufactured using the resultant non-aqueous electrolyte in a manner to be described later. The electric conductivity of the resultant non-aqueous electrolyte electric double-layer capacitor was measured using an electric conductivity meter (CDM210, manufactured by Radiometer Trading Co., Ltd.) while 5 mA of constant current was applied thereto.

If the electric conductivity of the non-aqueous electrolyte at 25° C. is at least 5.0 mS/cm, problems are not presented in actual use.

Manufacturing of Non-aqueous Electrolyte Electric Double-Layer Capacitor

Manufacturing of Positive and Negative Electrodes (Polarized Electrode)

Active carbon (Kuractive-1500 manufactured by Kuraray Co., Ltd.), acetylene black (conductive agent) and tetrafluoroethylene (PTFE) (binder) were mixed together such that a weight ratio thereof (active carbon/acetylene black/PTFE) was 8/1/1 to obtain a mixture.

100 mg of the resultant mixture was extracted, and the extracted mixture was placed into a 20 mm φ pressure-resistant carbon container and formed at a pressure of 150 kgf/cm² and at room temperature to manufacture the positive and negative electrodes (polarized electrode).

Manufacturing of Non-aqueous Electrolyte Electric Double-Layer Capacitor

A cell was assembled using the resultant positive and negative electrodes, an aluminum plate (collector) (thickness: 0.5 mm) and a polypropylene/polyethylene film (separator) (thickness: 25 μm), and the assembled cell was thoroughly dried by vacuum drying.

The cell was impregnated with the non-aqueous electrolyte to manufacture a non-aqueous electrolyte electric double-layer capacitor.

Example 7

A non-aqueous electrolyte was prepared in the same manner as that of Example 6 except that, in the "Preparation of Non-aqueous Electrolyte" in Example 6, an added amount of the phosphazene derivative (chain EO type phosphazene derivative (a compound in general formula (1), X has a structure of group (A), all of $Y^1$ to $Y^3$ and $y^5$ to $y^6$ are single bond, all of $R^1$ to $R^3$ and $R^5$ to $R^6$ are ethoxy group, and Z is oxygen)) was changed to 50% by volume, and the deterioration thereof was evaluated. Results are shown in Table 3.

Color tone changes of the non-aqueous electrolyte immediately after preparation thereof and after being left for two months in the glovebox were visually observed, and no color tone changes were detected.

Comparative Example 4

A non-aqueous electrolyte was prepared in the same manner as in Example 6 except that, in the "Preparation of Non-aqueous Electrolyte" in Example 6, the phosphazene derivative (chain EO type phosphazene derivative (a compound in which in general formula (1), X has a structure of group (A), all of $y^1$ to $Y^3$ and $y^5$ to $y^6$ are single bond, all of $R^1$ to $R^3$ and $R^5$ to $R^6$ are ethoxy groups, and Z is oxygen)) (an deterioration inhibitor for non-aqueous electrolyte electric double-layer capacitor) was not used. The deterioration of the resultant non-aqueous electrolyte was evaluated. Results are shown in Table 3.

Color tone changes of the non-aqueous electrolyte immediately after preparation thereof and after being left for two months in the glovebox were visually observed. After the non-aqueous electrolyte was left for two months in the glovebox, the color of the non-aqueous electrolyte had turned black (or brown).

Comparative Example 5

A non-aqueous electrolyte was prepared in the same manner as in Example 6 except that, in the "Preparation of Non-aqueous Electrolyte" in Example 6, instead of γ-butyrolactone (aprotic organic solvent), ethylene carbonate/diethylcarbonate (volume ratio of 1:1) (aprotic organic solvent) was used, and the phosphazene derivative (chain EO type phosphazene derivative (a compound in which in general formula (1), X has a structure of group (A), all of $y^1$ to $Y^3$ and $Y^5$ to $y^6$ are single bond, all of $R^1$ to $R^3$ and $R^5$ to $R^6$ are ethoxy groups, and Z is oxygen)) (an deterioration inhibitor for non-aqueous electrolyte electric double-layer capacitor) was not used. The deterioration of the resultant non-aqueous electrolyte was evaluated. Results are shown in Table 3.

Color tone changes of the non-aqueous electrolyte immediately after preparation thereof and after being left for two months in the glovebox were visually observed. After the non-aqueous electrolyte was left for two months in the glovebox, the color of the non-aqueous electrolyte had truned black (or brown).

TABLE 3

| | Increase in HF Concentration (ppm) | Electric Conductivity (mS/cm) | Color Changes | Evaluation of Deterioration |
|---|---|---|---|---|
| Example 6 | 0 | 7.6 | none | high stability, superior resistance to deterioration |
| Example 7 | 0 | 6.8 | none | extremely high stability, extremely superior resistance to deterioration |
| Comparative Example 4 | 50 | 8.3 | changed to brown | low stability, occurrence of deterioration |
| Comparative Example 5 | 60 | 8.0 | changed to brown | low stability, occurrence of deterioration |

Examples 8 to 10 and Comparative Example 6 of the additive for the non-aqueous electrolyte electric double-layer capacitor relating to the fourth aspect of the present invention are described hereinafter. The present invention is not limited to the Examples and the Comparative Example.

Example 8

Preparation of Non-aqueous Electrolyte

To 40 ml of γ-butyrolactone (aprotic organic solvent), 10 ml (20% by volume) of phosphazene derivative (chain EO type phosphazene derivative (a compound in which in general formula (1), X has a structure of group (A), all of $y^1$ to $Y^3$ and $Y^5$ to $y^6$ are single bond, all of $R^1$ to $R^3$ and $R^5$ to $R^6$ are ethoxy groups, and Z is oxygen) (an additive for non-aqueous electrolyte electric double-layer capacitor) was added. Then, tetraethyl ammonium fluoroborate $(C_2H_5)_4N \cdot BF_4$ (quaternary ammonium salt) was dissolved in the resultant mixture at concentration of 1 mol/kg to prepare a non-aqueous electrolyte.

Evaluation of Self-extinguishability or Incombustibility

The resultant non-aqueous electrolyte was evaluated as shown below in the same manner as the above-described "Self-Extinguishability and Incombustibility Evaluating Methods". Results are shown in Table 4.

Evaluation of Incombustibility

An evaluation of "incombustible" was recorded when an ignited flame did not reach a 25 mm line and material deposited from a net did not catch flame.

Evaluation of Self-Extinguishability

An evaluation of "self-extinguishable" was recorded when an ignited flame was extinguished at a line between 25 mm to 100 mm and material deposited from a net did not catch flame.

Evaluation of Combustibility

An evaluation of "combustible" was recorded when an ignited flame crossed a 100 mm line.

Manufacturing of Positive and Negative Electrodes (Polarized Electrodes)

Active carbon (Kuractive-1500 manufactured by Kuraray Co., Ltd.), acetylene black (conductive agent) and tetrafluoroethylene (PTFE) (binder) were mixed together such that a weight ratio thereof (active carbon/acetylene black/PTFE) was 8/1/1 to obtain a mixture.

100 mg of the resultant mixture was extracted, and the extracted mixture was placed into a 20 mm φ pressure-resistant carbon container and formed at a pressure of 150 kgf/cm² and at room temperature to manufacture the positive and negative electrodes (polarized electrode).

Manufacturing of Non-aqueous Electrolyte Electric Double-Layer Capacitor

A cell was assembled using the resultant positive and negative electrodes, an aluminum plate (collector) (thickness: 0.5 mm) and a polypropylene/polyethylene plate (separator) (thickness: 25 μm), and the assembled cell was thoroughly dried by vacuum drying.

The cell was impregnated with the non-aqueous electrolyte to manufacture a non-aqueous electrolyte electric double-layer capacitor.

Measurement of Electric Conductivity of Non-aqueous Electrolyte Electric Double-Layer Capacitor The electric conductivity of the resultant non-aqueous electrolyte electric double-layer capacitor was measured using an electric conductivity meter (CDM210 manufactured by Radiometer Trading Co., Ltd.), while 5 mA of constant current was applied thereto. Results are shown in Table 4.

If the electric conductivity of the non-aqueous electrolyte electric double-layer capacitor at 25° C. is at least 5.0 mS/cm, problems are not presented in actual use.

Example 9

A non-aqueous electrolyte was prepared in the same manner as that of Example 8 except that, in the "Preparation of Non-aqueous Electrolyte" in Example 8, an added amount of the phosphazene derivative (chain EO type phosphazene derivative (a compound in which in general formula (1), X has a structure of group (A), all of $y^1$ to $Y^3$ and $Y^5$ to $y^6$ are single bond, all of $R^1$ to $R^3$ and $R^5$ to $R^6$ are ethoxy group, and Z is oxygen)) was changed to 80% by volume, and the incombustibility or the self-extinguishability of the resultant non-aqueous electrolyte was evaluated. Further, a non-aqueous electrolyte electric double-layer capacitor was manufactured in the same manner as in Example 8 and its electric conductivity was measured and evaluated. Results are shown in Table 4.

Example 10

A non-aqueous electrolyte was prepared in the same manner as that of Example 8 except that, in the "Preparation of Non-Aqueous Electrolyte" in Example 8, the additive for non-aqueous electrolyte electric double-layer capacitor was changed to a compound in which hydrogen elements in ethoxy groups in the phosphazene derivative (chain EO type phosphazene derivative (a compound in which in general formula (1), X has a structure of group (A), all of $Y^1$ to $Y^3$ and $Y^5$ to $y^6$ are single bond, all of $R^1$ to $R^3$ and $R^5$ to $R^6$ are ethoxy groups, and Z is oxygen)) were substituted by fluorine (the content of the fluorine in the phosphazene derivative was 12.4%), and an added amount of the additive for non-aqueous electrolyte electric double-layer capacitor was changed to 60% by volume. The incombustibility or the self-extinguishability of the resultant non-aqueous electrolyte was evaluated. Further, a non-aqueous electrolyte electric double-layer capacitor was manufactured in the same manner as in Example 8 and the electric conductivity thereof was measured and evaluated. Results are shown in Table 4.

Comparative Example 6

A non-aqueous electrolyte was prepared in the same manner as that of Example 8 except that, in the "Preparation of Non-aqueous Electrolyte" in Example 8, the phosphazene derivative (chain EO type phosphazene derivative (a compound in which in general formula (1), X has a structure of group (A), all of $y^1$ to $Y^3$ and $Y^5$ to $y^6$ are single bond, all of $R^1$ to $R^3$ and $R^5$ to $R^6$ are ethoxy groups, and Z is oxygen)) (an additive for non-aqueous electrolyte electric double-layer capacitor) was not used. The incombustibility or the self-extinguishability of the resultant non-aqueous electrolyte was evaluated. Further, a non-aqueous electrolyte electric double-layer capacitor was manufactured in the same manner as in Example 8 and the electric conductivity thereof was measured and evaluated. Results are shown in Table 4.

TABLE 4

| | Electric Conductivity (mS/cm) | Evaluation of Self-Extinguishability or Incombustibility |
|---|---|---|
| Example 8 | 9.0 | Self-Extinguishable |
| Example 9 | 7.9 | Incombustible |
| Example 10 | 8.2 | Incombustible |
| Comparative Example 6 | 9.0 | Incombustible |

What is claimed is:

1. A non-aqueous electrolyte electric double-layer capacitor comprising:
   a positive electrode;
   a negative electrode; and
   a non-aqueous electrolyte which contains at least 2% by volume to less than 20% by volume of phosphazene derivative and a supporting electrolyte.

2. The non-aqueous electrolyte electric double-layer capacitor of claim 1, wherein the non-aqueous electrolyte contains at least 3% by volume to less than 20% by volume of the phosphazene derivative.

3. The non-aqueous electrolyte electric double-layer capacitor of claim 1, wherein the supporting electrolyte is a quaternary ammonium salt.

4. The non-aqueous electrolyte electric double-layer capacitor of claims 1, wherein the non-aqueous electrolyte contains a aprotic organic solvent.

5. The non-aqueous electrolyte electric double-layer capacitor of claim 4, wherein the aprotic organic solvent contains a cyclic ester compound or a chain ester compound.

6. A non-aqueous electrolyte electric double-layer capacitor comprising:
   a positive electrode;
   a negative electrode; and
   a non-aqueous electrolyte which contains at least 20% by volume of phosphazene derivative and a supporting electrolyte.

7. The non-aqueous electrolyte electric double-layer capacitor of claim 6, wherein the non-aqueous electrolyte contains at least 30% by volume of phosphazene derivative.

8. The non-aqueous electrolyte electric double-layer capacitor of claim 6, wherein the phosphazene derivative has substituents including halogen in its molecular structure.

9. The non-aqueous electrolyte electric double-layer capacitor of claim 8, wherein a content of halogen in the phosphazene derivative is 2 to 80% by weight.

10. The non-aqueous electrolyte electric double-layer capacitor of claim 6, wherein the non-aqueous electrolyte contains an aprotic organic solvent.

11. The non-aqueous electrolyte electric double-layer capacitor of claim 10, wherein the aprotic organic solvent contains a cyclic ester compound or a chain ester compound.

12. An deterioration inhibitor for non-aqueous electrolyte electric double-layer capacitor which is added to the non-aqueous electrolyte in the non-aqueous electrolyte electric double-layer capacitor which has a non-aqueous electrolyte which contains the supporting electrolyte and the organic solvent, and which contains at least a phosphazene derivative.

13. The deterioration inhibitor for non-aqueous electrolyte electric double-layer capacitor of claim 12, wherein an added amount of the deterioration inhibitor to the non-aqueous electrolyte is 2 to 90% by volume.

14. The deterioration inhibitor for non-aqueous electrolyte electric double-layer capacitor of claim 12, wherein the added amount of the deterioration inhibitor to the non-aqueous electrolyte is at least 2% by volume to less than 20% by volume.

15. The deterioration inhibitor for non-aqueous electrolyte electric double-layer capacitor of claim 12, wherein the added amount of the deterioration inhibitor to the non-aqueous electrolyte is 3 to 75% by volume.

16. The deterioration inhibitor for non-aqueous electrolyte electric double-layer capacitor of claim 12, wherein the added amount of the deterioration inhibitor to the non-aqueous electrolyte is at least 3% by volume to less than 20% by volume.

17. An additive for non-aqueous electrolyte electric double-layer capacitor which is added to a non-aqueous electrolyte in a non-aqueous electrolyte electric double-layer capacitor which contains a supporting electrolyte and an organic solvent, and which contains at least a phosphazene derivative.

18. The additive for non-aqueous electrolyte electric double-layer capacitor of claim 17 whose added amount to the non-aqueous electrolyte is 20 to 90% by volume and which is used as a self-extinguishing agent for non-aqueous electrolyte electric double-layer capacitor.

19. The additive for non-aqueous electrolyte electric double-layer capacitor of claim 17 whose added amount to the non-aqueous electrolyte is at least 20% by volume to less than 30% by volume and which is used as the self-extinguishing agent for non-aqueous electrolyte electric double-layer capacitor.

20. The additive for non-aqueous electrolyte electric double-layer capacitor of claim 17 whose added amount to the non-aqueous electrolyte is 30 to 90% by volume and which is used as a fire-resistant agent for non-aqueous electrolyte electric double-layer capacitor.

* * * * *